(12) United States Patent
Yoon

(10) Patent No.: US 11,542,991 B2
(45) Date of Patent: Jan. 3, 2023

(54) CLUTCH SYSTEM INTERLOCKING WITH ACCELERATOR AND BRAKE PEDAL

(71) Applicant: AUTODYN SYS INC., Incheon (KR)

(72) Inventor: Jongyun Yoon, Incheon (KR)

(73) Assignee: AUTODYN SYS INC., Incheon (KR)

( * ) Notice: Subject to any disclaimer, the term of this patent is extended or adjusted under 35 U.S.C. 154(b) by 0 days.

(21) Appl. No.: 17/429,407

(22) PCT Filed: Jul. 20, 2020

(86) PCT No.: PCT/KR2020/009538
§ 371 (c)(1),
(2) Date: Aug. 9, 2021

(87) PCT Pub. No.: WO2021/029548
PCT Pub. Date: Feb. 18, 2021

(65) Prior Publication Data
US 2022/0128103 A1 Apr. 28, 2022

(30) Foreign Application Priority Data

Aug. 14, 2019 (KR) .................. 10-2019-0099195
Jun. 23, 2020 (KR) .................. 10-2020-0076343

(51) Int. Cl.
*F16D 41/06* (2006.01)
*F16D 41/066* (2006.01)
*F16D 23/14* (2006.01)

(52) U.S. Cl.
CPC .......... *F16D 41/066* (2013.01); *F16D 23/14* (2013.01)

(58) Field of Classification Search
CPC ... F16D 2500/3144; F16D 2500/31426; F16D 2500/104–10493; F16D 41/066; F16D 23/14
See application file for complete search history.

(56) References Cited

U.S. PATENT DOCUMENTS

| | | | | |
|---|---|---|---|---|
| 5,020,645 | A | * | 6/1991 | Sasa ............... B60W 30/18063 477/34 |
| 2016/0298704 | A1 | | 10/2016 | Itagaki et al. |
| 2022/0126687 | A1 | * | 4/2022 | Yoon ....................... F16D 23/12 |
| 2022/0128104 | A1 | * | 4/2022 | Yoon ....................... F16D 15/00 |
| 2022/0154779 | A1 | * | 5/2022 | Yoon ....................... F16D 23/14 |

FOREIGN PATENT DOCUMENTS

| | | |
|---|---|---|
| JP | 2008-224025 A | 9/2008 |
| JP | 2016-156440 A | 9/2016 |
| KR | 20-0313732 Y1 | 5/2003 |
| KR | 20-0431446 Y1 | 11/2006 |

OTHER PUBLICATIONS

Machine Translation of KR 200313732 Y1 (Year: 2003).*

* cited by examiner

*Primary Examiner* — David R Morris
(74) *Attorney, Agent, or Firm* — Korus Patent, LLC; Seong Il Jeong

(57) ABSTRACT

The present invention provides a new clutch system that ensures a 100% torque transmission rate between an engine and a transmission in a vehicle system, that can be commonly applied to conventional manual transmission vehicles and automatic vehicles, and that operates in conjunction with an accelerator pedal and a brake pedal.

6 Claims, 18 Drawing Sheets

CLUTCH SYSTEM INTERLOCKING WITH ACCELERATOR AND BRAKE PEDAL

FIELD OF THE INVENTION

The present invention relates to a clutch system interlocking with an accelerator and a brake pedal that ensures a 100% torque transmission rate between an engine and a transmission in a vehicle system, that can be commonly applied to conventional manual transmission and automatic devices, and that operates by interlocking with an accelerator and a brake pedal.

The present invention is based on Korean Patent Application No. 10-2019-0099195, filed on Aug. 14, 2019. Some parts of the present invention are disclosed in Korean Patent Application No. 10-2020-0051364, filed on Apr. 28, 2020, entitled "Rotary Shaft Assembly"; Korean Patent Application No. 10-2020-0034811, filed on Mar. 23, 2020, entitled "Clutch Assembly"; and Korean Patent Application No. 10-2019-0166488, filed on Dec. 13, 2019, entitled "Power Transmission Device".

BACKGROUND OF THE INVENTION

The wheels of the vehicle rotate in such way that rotations of the engine are changed in the transmission through the flywheel and clutch discs, and transmitted to the main shaft.

In case of manual transmission vehicles, the connection or disconnection of the flywheel and disc is achieved by the clutch pedal installed on the upper floor of the left side of the driver's seat. When the clutch pedal is pressed, the connection between the two members is cut off; when the pedal is released, the two member are connected. When the driver presses the clutch pedal, shifts the gear in a state of pressing the clutch, and then slowly takes the foot off the pedal, the vehicle becomes in a state of a semi-clutch, which is about to come into contact between the flywheel and disk.

In case of automatic transmission vehicles, the vehicles do not have a clutch pedal, and are driven by detecting rotations of the engine, speed of the vehicle, and automatically shifting the transmission depending on the vehicle loads. The vehicle consists of the torque converter, the oil pump, the hydraulic clutch, the planetary gear set, the rotary sensor, the deceleration gear, and the valve body. The transmission part consists of a combination of the planetary gear set, the wet multi-plate clutches, and the brake.

Manual and automatic transmission vehicles have developed by imitating strengths of each other. For example, manual transmission vehicles have adopted the automatic control algorithms of the automatic transmission; automatic transmission vehicles have partially adopted the mechanical friction clutch of the manual transmission for improving fuel efficiency. However, the design structures of the manual and automatic transmission vehicles have retained the first developed platforms, respectively.

In case of automatic transmission vehicles, they have to be switched in conjunction with the clutch pedal at the same time; thus, there is a low preference in South Korea and North America due to slipping when re-starting on ramps. Accordingly, it is necessary to develop a system that enables transmission without a clutch pedal and that prevents slipping on ramps.

In case of automatic transmission vehicles, they have a low fuel efficiency due to the torque transmission through fluid, and are vulnerable to a torque short that is transferred into the transmission from the engine in the abnormal event such as a sudden unintended acceleration. Accordingly, it is necessary to develop a system that eliminates possibilities of a sudden unintended acceleration by mechanically operating states of acceleration, semi-clutch, and stop.

DETAILED DESCRIPTION OF THE INVENTION

Technical Problems

Accordingly, the present invention is suggested to provide a noble clutch system that ensures a 100% torque transmission rate between an engine and a transmission in a vehicle system, can be commonly applied to conventional manual transmission and automatic devices, and operates by interlocking with an accelerator and a brake pedal.

SUMMARY OF THE INVENTION

To solve the problems mentioned above, the present invention provides a clutch system comprises: a clutch assembly connected or disconnected to an engine of a vehicle, wherein a state of the clutch assembly is changed by pressing or releasing of an accelerator pedal or a brake pedal, and a rotary shaft assembly including: a power transmission device transmitting a motion of pressing or releasing of the accelerator pedal and the brake pedal into the clutch assembly, and a driving shaft connected to the power transmission device.

The clutch assembly may be in any one of states including: a first state transmitting a rotational force of the engine by pressing the accelerator pedal; a third state cutting off a connection between the engine and the driving shaft by pressing the brake pedal, and a fourth state that is an initial transition state or intermediate state transmitting a rotational force of the engine to the transmission by releasing the brake pedal.

The driving shaft of the rotational body assembly connected to the power transmission device may linearly move to a first direction by pressing the accelerator pedal, and the clutch assembly is positioned in the first state.

The driving shaft of the rotational body assembly connected to the power transmission device may linearly move to a second direction that is opposite to the first direction by pressing the brake pedal, and the clutch assembly is positioned in the third state.

The driving shaft of the rotational body assembly connected to the power transmission device may linearly move to the first direction by releasing the brake pedal from the third state, and the clutch assembly is positioned in the fourth state.

The power transmission device may include: an accelerator actuator connected to a cable of the accelerator pedal to drive, and a brake actuator connected to a cable of the brake pedal to drive and placed in an opposite side to the accelerator actuator.

The clutch assembly may include: an out-cam rotating in conjunction with the accelerator pedal and the brake pedal of the vehicle; an in-cam rotating according to rotation of the engine of the vehicle; a rotary member contacted with the out-cam and selectively contacted with the in-cam by moving in a height direction according to rotation of the out-cam, and a forked part supporting the rotary member and rotating in conjunction with the rotary member, wherein a rotational force of the engine is sequentially transmitted through the in-cam, the rotary member, and the forked part.

At least one of protrusion may be formed on a sleeve of a rotary shaft of the out-cam of the clutch assembly, wherein at least one of guide slot is formed on the driving shaft to receive the protrusion, respectively, wherein the guide slot includes: a first path having a linear shape, and a second path extending to form an inclined angle with the first path, wherein the protrusion rotates by the inclined angle formed between the first and the second path according to linear movement of the driving shaft in one direction, thereby rotating the out-cam.

Technical Effects of the Invention

The clutch system of the present invention can expand the base of manual transmission vehicles with simplified transmission, and enables accurate and permanent uses by interlocking with the accelerator and brake pedal.

In addition, the clutch system of the present invention mechanically operates power transmission, thereby preventing sudden unintended acceleration and enabling protection of both drivers and pedestrians.

Furthermore, the clutch system of the present invention can be applied to all vehicles. In case of hybrid cars, the clutch system can replace the main component that transmits power generated from the internal combustion engines at the point that the internal combustion engine operates. In addition, the clutch system can be applied to the components that require power transmission in a large system such as electric vehicles and other power plants, which uses the internal combustion engines.

DETAILED DESCRIPTION EMBODIMENTS OF THE INVENTIONS

Hereafter, the present invention will be described in detail in conjunction with the accompanying drawings. All terms used in the specification and claims may not be limited to be interpreted as definitions in a generally-used dictionary, and may be defined according to the inventive concept of the present invention. The embodiments in the specification and structures shown in drawings are embodiments of the present invention, and are not restricting or limiting the scopes of the inventive concepts of the present invention.

Before describing the rotary shaft assembly, the overall configuration of the clutch system and the clutch assembly will be explained referring to FIGS. 1 to 9.

1. Overall Configuration of Clutch System

Figure 1:
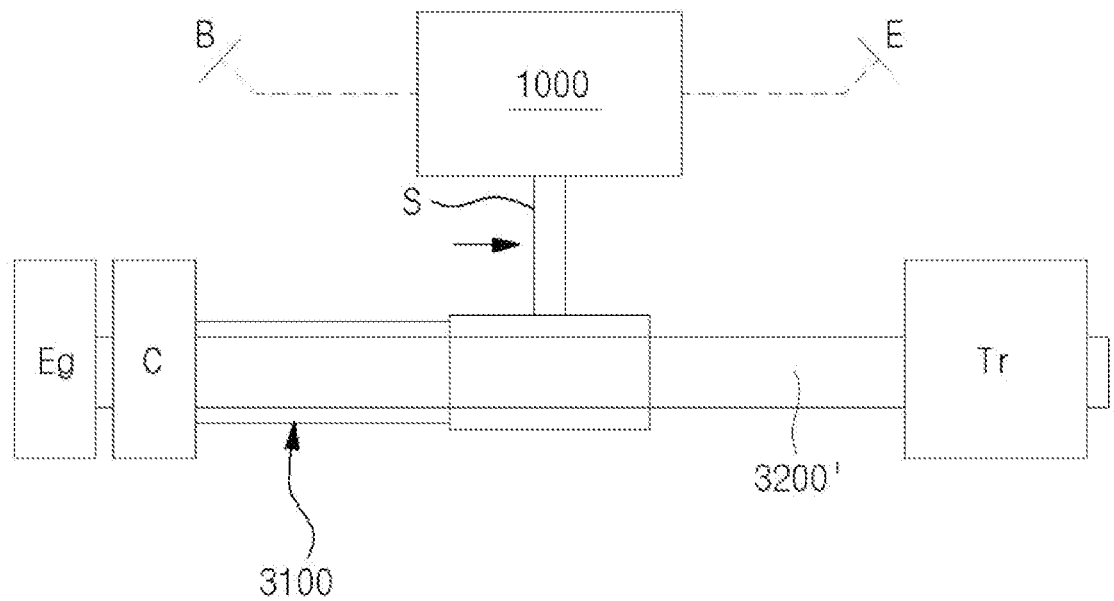
FIG. 1 is a schematic drawing of a clutch system of the present invention.

FIG. 1 is a schematic drawing of a clutch system of the present invention.

The clutch system comprises an engine Eg, and a clutch assembly C connected or disconnected to the engine Eg. An input shaft 3200' connects between the clutch assembly C and a transmission Tr. The configurations and functions of the engine Eg, the transmission Tr, and the input shaft 3200' have been already disclosed; however, any of the conventional or newly developed ones can be used.

The location and state of the clutch assembly C are changed by pressing or releasing an accelerator pedal E, or pressing or releasing a brake pedal B. A power transmission device 1000 and a driving shaft 3100' are provided to transmit a state of pressing or releasing of the accelerator pedal and the brake pedal E, B to the clutch assembly C. The power transmission device 1000 and the driving shaft 3100' are connected to each other through a connection member S such as rod. The operation of the power transmission device 1000 is transmitted to the driving shaft 3100', and the operation of the driving shaft 3100' is transmitted to the clutch assembly C. The driving shaft 3100' is not connected to the transmission Tr. One side of the power transmission device 100 interlocks with the accelerator pedal E through a certain part, a cable for example, and the other side of the power transmission device 100 interlocks with the brake pedal B.

Figure 2:
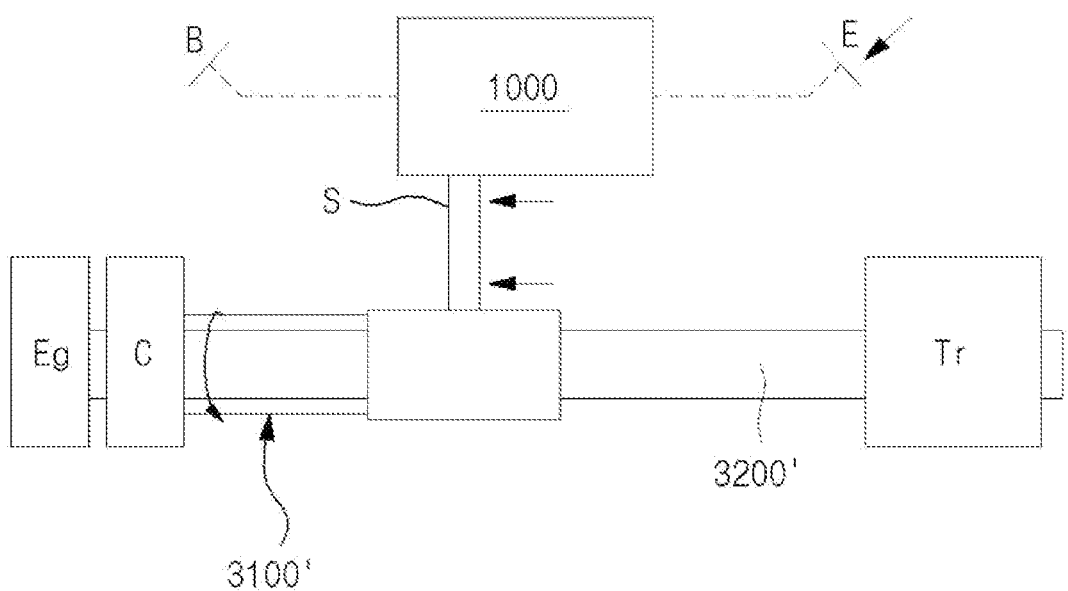
FIG. 2 is a schematic drawing of the clutch system when a driver presses an accelerator pedal.

FIG. 2 is a schematic drawing of the clutch system when the driver presses the accelerator pedal E.

When the driver presses the accelerator pedal E, the connection member S linearly moves to a first direction of FIG. 2, to the left side for example, according to the operation of the power transmission device 1000. Then, the driving shaft 3100' linearly moves to the left side, and the linear motion of the driving shaft 3100' is converted to rotary motion of the clutch assembly C. Accordingly, the clutch assembly C transitions to "a first state". In the first state, the clutch assembly C transmits the rotational force of the engine Eg to the transmission Tr through the input shaft 3200'. When the driver keeps pressing the accelerator pedal E, the increased rotational force of the engine Eg is transmitted to the transmission Tr, and the clutch assembly C maintains the first state.

Figure 3:
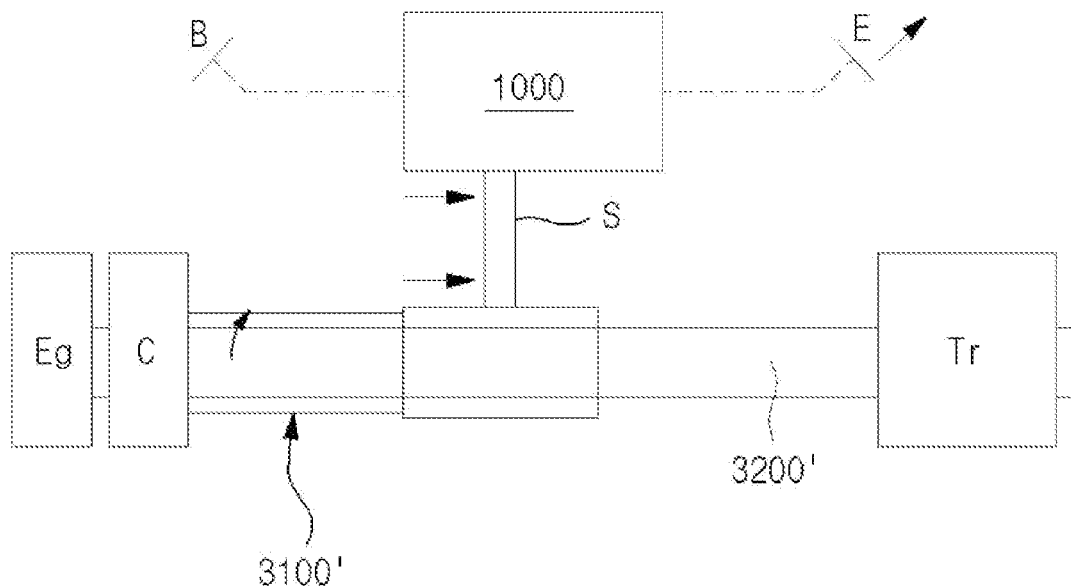
FIG. 3 is a schematic drawing of the clutch system when the driver releases the accelerator pedal from the state shown in FIG. 2.

FIG. 3 is a schematic drawing of the clutch system when the driver releases the accelerator pedal E from the state shown in FIG. 2.

When the driver releases the accelerator pedal E, the connection member S linearly moves a bit to a second direction of FIG. 3, to the right side for example, according to the operation of the power transmission device 1000. Then, the driving shaft 3100' linearly moves a bit to the right side, and the linear motion of the driving shaft 3100' is converted to rotary motion of the clutch assembly C, which rotates in an opposite direction to a direction that the clutch assembly C rotates in FIG. 2. In this instance, the location of the clutch assembly C is different from that in the first state; however, "a second state", in which the clutch assembly C transmits the rotational force of the engine Eg to the transmission Tr through the input shaft 3200', keeps the same.

In general, the clutch has a function of connecting between the engine and the transmission when the accelerator pedal E is either pressed or released. In this respect, the functions of clutch assembly C in FIGS. 2 and 3 may be essentially the same.

Figure 4:
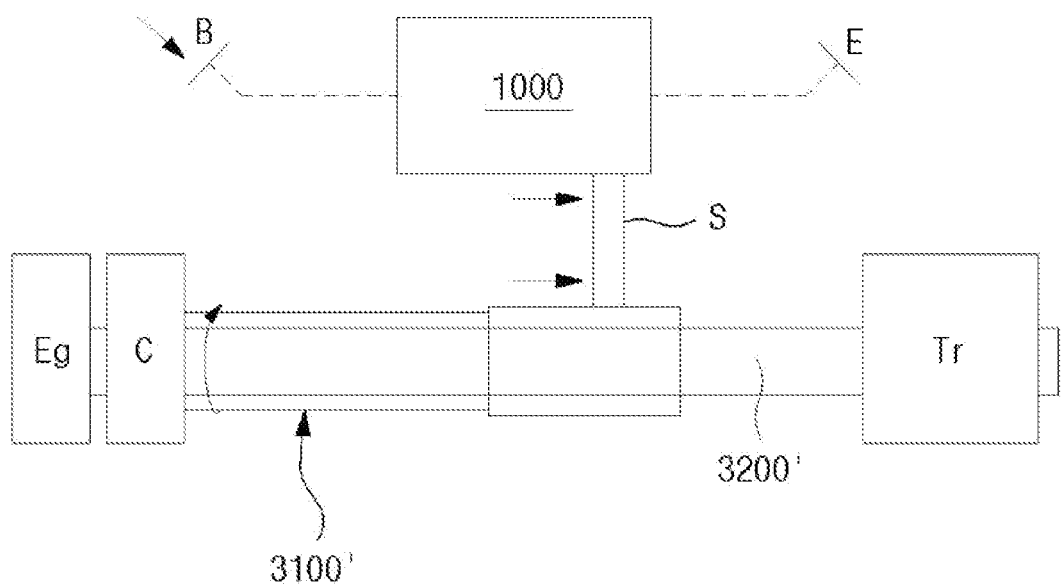
FIG. 4 is a schematic drawing of the clutch system when the driver presses the brake pedal from the state shown in FIG. 3, the state that the driver releases the accelerator pedal.

FIG. 4 is a schematic drawing of the clutch system when the driver presses the brake pedal B from the state shown in FIG. 3. The state shown in FIG. 3 refers to when the driver releases the accelerator pedal E.

When the driver presses the brake pedal B, the connection member S linearly moves to the second direction of FIG. 4, to the right side for example, according to the operation of the power transmission device 1000. Then, the driving shaft 3100' linearly moves to the right side, and the linear motion of the driving shaft 3100' is converted to rotary motion of the clutch assembly C, which rotates in an opposite direction to the direction shown in FIG. 2. In this instance, the clutch assembly C transitions to "a third state". In the third state, the clutch assembly C cuts off the connection between the engine Eg and the input shaft 3200', and does not transmit power to the transmission Tr. The difference from the state shown in FIG. 3 is that the connection member S of the power transmission device 1000 moves further to the right side. The clutch assembly C rotates further to the same direction as shown in FIG. 3, and transitions to the definite cut-off state, in which the rotational force of the engine Eg is not transmitted to the input shaft 3200'.

Figure 5:
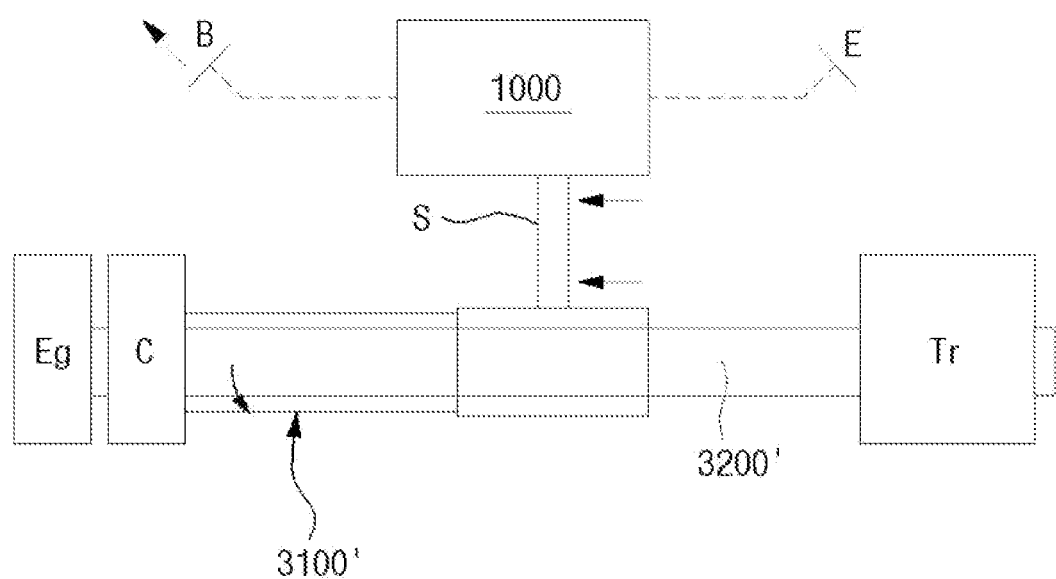
FIG. 5 is a schematic drawing of the clutch system when the driver releases the brake pedal from the state shown in FIG. 4, the state that the driver presses the brake pedal.

FIG. 5 is a schematic drawing of the clutch system when the driver releases the brake pedal B from the state shown in FIG. 4. The state shown in FIG. 4 refers to when the driver presses the brake pedal B.

When the driver releases the brake pedal B, the connection member S linearly moves a bit to the first direction of FIG. 2, to the left side for example, according to the operation of the power transmission device 1000. Then, the driving shaft 3100' linearly moves a bit to the left side, and the linear motion of the driving shaft 3100' is converted to rotary motion of the clutch assembly C in the same direction as the direction shown in FIG. 2. In this instance, the clutch assembly C is converted to "a fourth state", a so-called semi-clutch state, in which the flywheel of the engine Eg is about to come into contact with disk. The term "semi-clutch state" in the present invention is used to indicate an initial, unstable state of transmission from a rotational force of the engine Eg to the transmission Tr. Even though the term "semi-clutch state" in the present invention uses the same word "semi-clutch state" referring to a state, in which a clutch pedal in a manual vehicle is released, the "semi-clutch state" in the present invention is fundamentally different from that in manual vehicles in that the brake pedal B is released in the "semi-clutch state" in the present invention. Hereafter, "semi-clutch state" will be referred to as a transition state or an intermediate state.

To drive the vehicle, the driver starts the vehicle, pressing the brake pedal B, and presses the accelerator pedal E after releasing the brake pedal B. In this case, the states of the clutch system sequentially transition as shown in FIGS. 4, 5, and 2. In other words, the clutch system sequentially transitions to the state of a cut-off between the engine Eg and the transmission Tr; a state of an initial power transmission, a semi-clutch state or transition state; and a state of a power connection between the engine Eg and the transmission Tr. When the driver repetitively presses and the releases the accelerator pedal E and the brake pedal B while driving, the clutch system also transitions to any one state of FIGS. 2 to 5 or keeps the previous state. The clutch system can eliminate a clutch pedal of a manual vehicle, and can be applied to all kind of vehicles including manual and automatic vehicles.

2-1. Power Transmission Device

The power transmission device 1000 may be defined as a rectangular box shape as an external shape. The box may be defined by a long rectangular frame 1002 as illustrated. On the right side of the frame 1002, an accelerator actuator 1000E1 connected to a hydraulic line of the accelerator pedal E is installed, and on the left side, a brake actuator 1000B1 connected to a hydraulic line of the brake pedal B is installed. A first head 1022 is installed on the front side, the left side in FIG. 6, of a screw-shaped rotary shaft connected to the accelerator actuator 1000E1, and a second head 1032 is installed on the front side, the right side in FIG. 6, of the rotary shaft of the brake actuator 1000B1. A first and second spring 1000S1, 1000S2 having cylindrical shapes are installed between the first and the second head 1022, 1032. The first and second head 1022, 1032 may be pressurized bolts for example.

Figure 6:
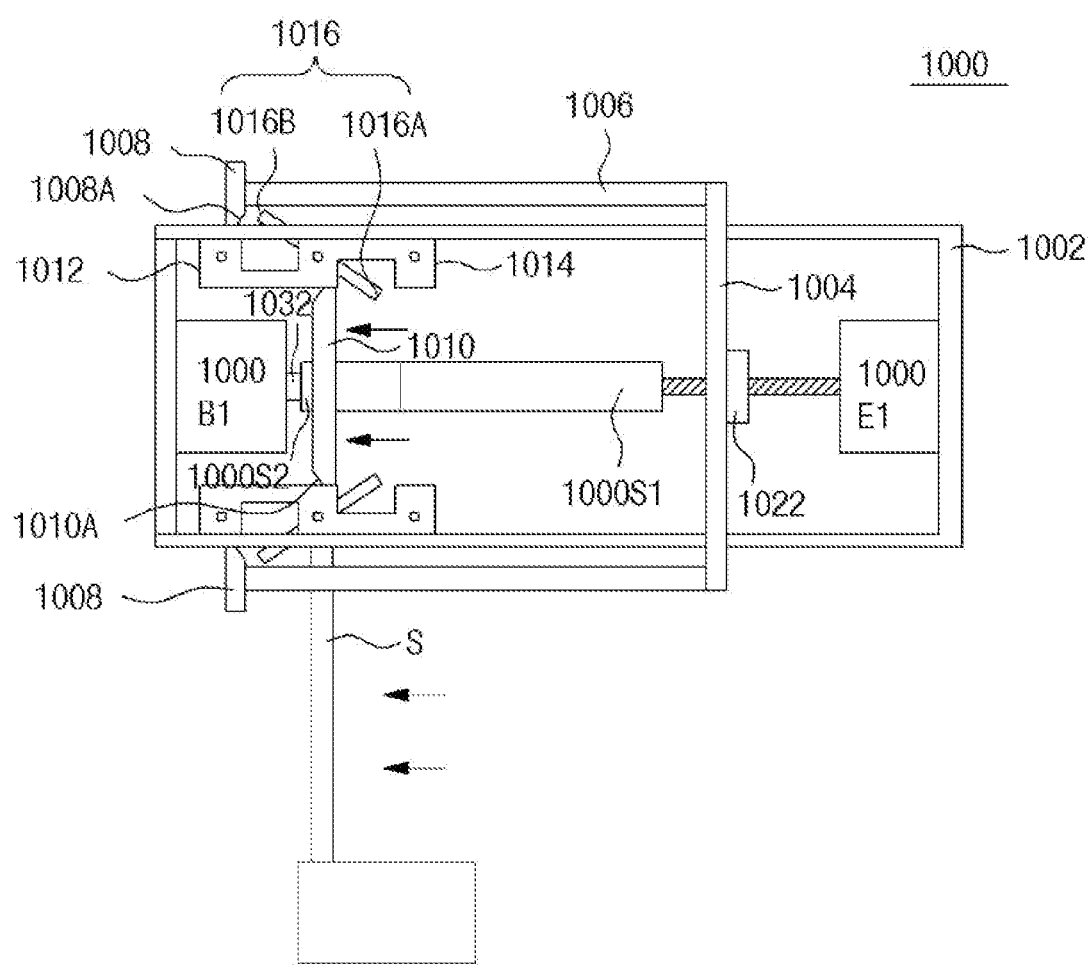
FIG. 6 is a schematic drawing of a power transmission device of the present invention when the accelerator pedal is pressed.

In FIG. 6, a moving bar 1004 is installed across the frame 1002 so that the first head 1022 comes into contact with a center part of the moving bar 1004, and a pair of side bars 1006 respectively extend in parallel from each of a top and bottom end of the moving bar 1004 toward the left side of FIG. 6 outside the frame 1002. Guides 1008, such as wedge, are attached to the other ends of the side bars 1006, respectively. A lower portion of the guide 1008 forms an oblique slope 1008A.

A first support 1012 having a shape of "⊔" and a second support 1014 having a shape of "⊓" are formed continuously on both of the top and bottom of the left side inside the frame 1002. A rotary bar 1016 protrudes outward through the first support 1012, the inner space of the first support 1012, and frame 1002. An upper portion of a rotary bar 1016 forms a first slope 1016B, which corresponds with the slope 1008A of the lower portion of the guide 1008. A lower portion of the rotary bar 1016, which is placed toward the inside, also forms an oblique second slope 1016A.

In the present invention, a driving bar 1010 is installed vertically inside the frame 1002, and the right side of the driving bar 1010 comes in contact with the first spring 1000S1, and the left side comes in contact with the second spring 1000S2. The front sides, the left sides in FIG. 6, of both upper and lower end of the driving bar 1010 are cut and form oblique slopes 1010A that correspond to the second slopes 1016A of the lower portion of the rotary bars 1016. The lower or lateral side of the driving bar 1010 is connected to the connection member S although not illustrated in FIG. 6.

The above describes the basic configuration of the power transmission device 1000. Especially, FIG. 6 illustrates the operation of the power transmission device 1000 when the driver presses the accelerator pedal E. In other words, when the driver presses the accelerator pedal E, the accelerator actuator 1000E1 is operated by a hydraulic pressure introduced through the hydraulic line, and thus, the first head 1022 moves to the left side. Accordingly, as the moving bar 1004 and the side bar 1006 move together to the left side, and the guide 1008 of the side bar 1006 hits the rotary bar 1016 from the back side, the rotary bar 1016 rotates counterclockwise to allow the driving bar 1010 to move to the left side. The driving bar 1010 is pressurized by the first spring 1000S1 to move to the position illustrated in FIG. 6 while beating the elastic force of the second spring 1000S2 and pressurizing the second spring 1000S2. The flat surfaces of the upper and lower end of the driving bar 1010 are in contact with the inner surfaces of the first supports 1012 formed in the top and the bottom side of the frame 1002, respectively. In this instance, the connection member S moves to the left side, and the clutch assembly rotates to become in the first state.

Figure 7:
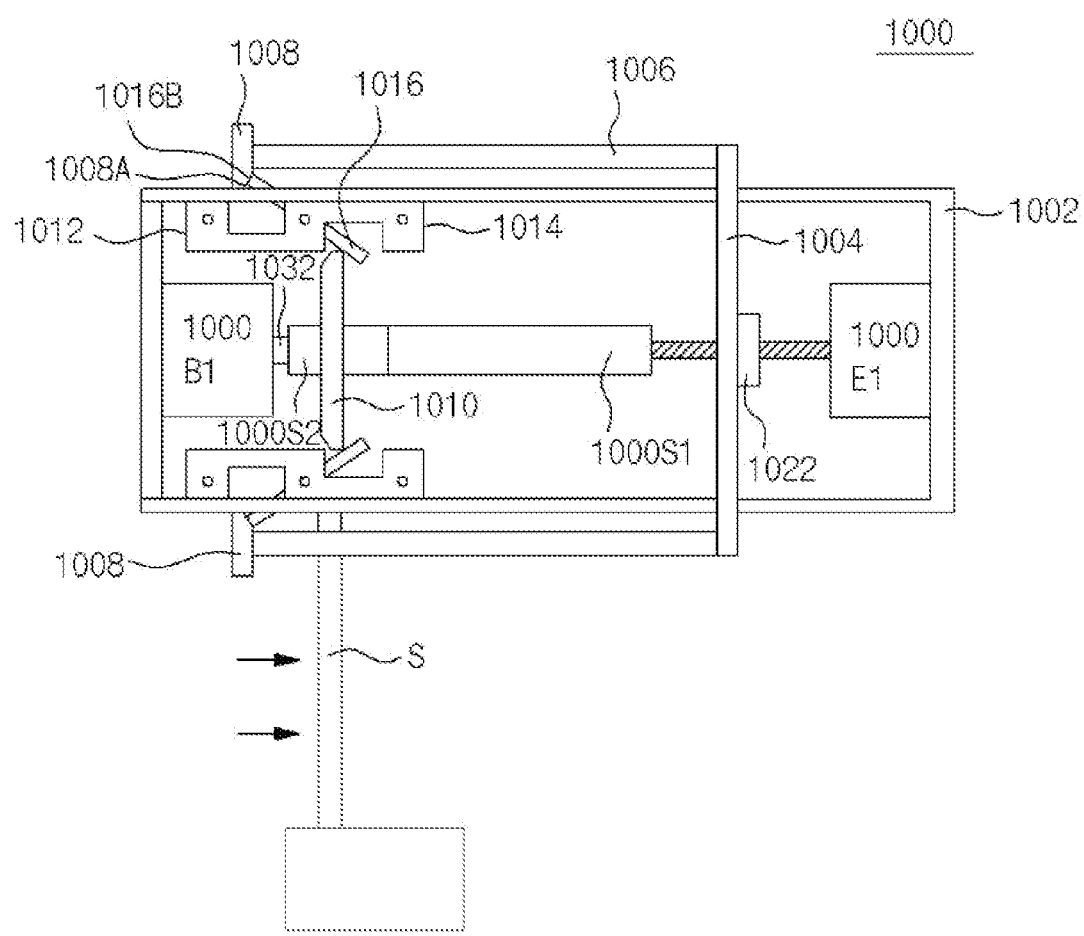
FIG. 7 is a schematic drawing of the power transmission device when the accelerator pedal is released.

When the driver releases the accelerator pedal E from the state shown in FIG. 6, the operation of the accelerator actuator 1000E1 stops, and the pressurizing force of first spring 1000S1 is released. Accordingly, the second spring 1000S2 starts pushing the driving bar 1010 to the right side. As the driving bar 1010 moves to the right side, the moving bar 1004 and the side bar 1006 also move in the same direction; however, the slope 1008A of the guide 1008 interferes with the first slope 1016B of the side bar 1006, and the guide 1008 stops the movement of the side bar 1006 at the position where it can no longer move. This state is illustrated in FIG. 7. In this position, the movement of the driving bar 1010 stops in a state that the driving bar 1010 is moved slightly to the right side. The connection member S is also moved to the right side by the moving distance of the driving bar 1010. Accordingly, the clutch assembly rotates to the position corresponding to the releasing state of the accelerator pedal E, and becomes in the secondary state.

When the driver presses the brake pedal B from the state shown in FIG. 7, the brake actuator 1000B1 is operated by a hydraulic pressure introduced through the hydraulic line, moving the second head 1032 further to the right side. Accordingly, the moving bar 1004 and the side bar 1006 move together to the right side, and the driving bar 1010 is pressurized by the second spring 1000S2 to move to the position shown in FIG. 8 while beating the elastic force of the first spring 1000S1 and pressing the first spring 1000S1. The flat surfaces of the upper and lower end of the driving bar 1010 are in contact with the inner surfaces of the second supports 1014 formed in the top and the bottom side of the frame 1002, respectively. The connection member S moves to the right side, and accordingly, the clutch assembly rotates to the position corresponding to the pressing state of the brake pedal B, and becomes in the third state.

Figure 8:
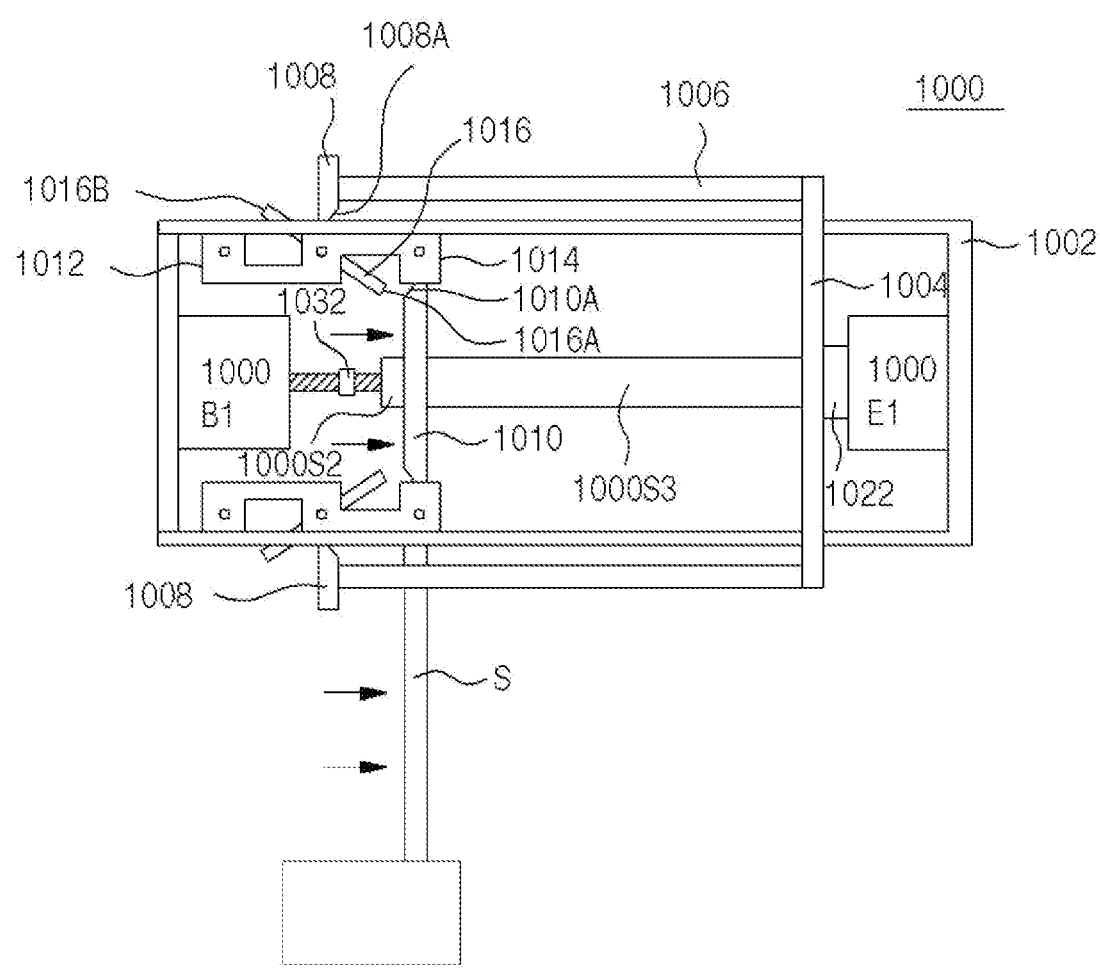
FIG. 8 is a schematic drawing of the power transmission device when the brake pedal is pressed.

When the driver releases the brake pedal B from the state shown in FIG. 8, the driving bar 1010 is moved to the left side as shown in FIG. 6.

The connection member S also moves to the left side by the moving distance of the driving bar 1010. Accordingly, the clutch assembly rotates to the position corresponding to the releasing state of the brake pedal B, and becomes in the fourth state. This state is illustrated in FIG. 9.

Figure 9:
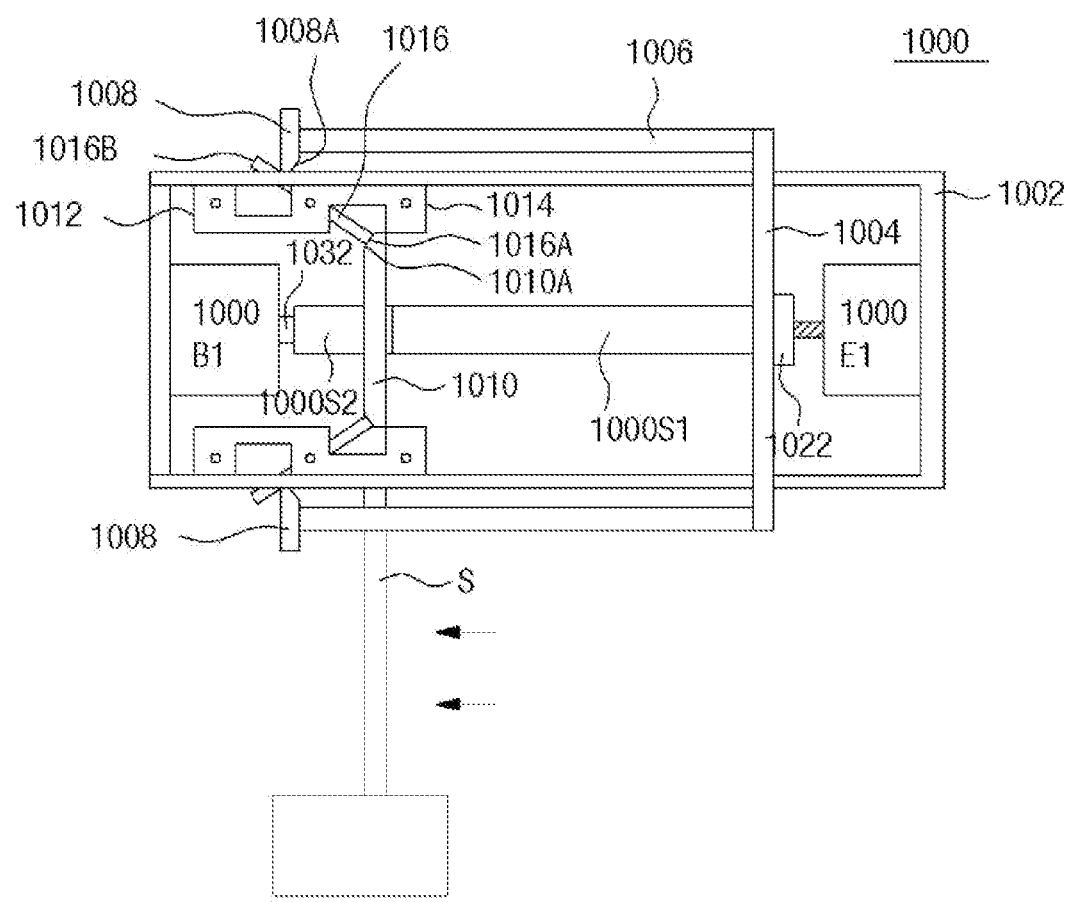
FIG. 9 is a schematic drawing of the power transmission device when the brake pedal is released from the state shown in FIG. 8.

Thus, referring to FIGS. 6, 7, 8, and 9 together, the driving bar 1010 can be placed in the accelerator pedal pressing position shown in FIG. 6, the accelerator pedal releasing position shown in FIG. 7, the brake pedal releasing position shown in FIG. 9, and the brake pedal pressing position shown in FIG. 8. If the driver presses the brake pedal B to start driving the vehicle, releases the brake pedal B, and then presses the accelerator pedal E, then the power transmission 1000 sequentially becomes in the states shown in FIGS. 8, 9 and 7. Accordingly, the clutch assembly C sequentially transitions to the state of the cut-off between the engine Eg and the transmission Tr; the state of the initial power transmission, the semi-clutch state or transition state; and the state of the power connection between the engine Eg and the transmission Tr.

The power transmission device 1000 and connection member S described above can be modified in various forms. The connection member S mentioned above is a rod-shaped linear member, but can be replaced by a link apparatus or a push apparatus with a trigger on the tip. The parts in the power transmission device 1000, such as the frame 1002, the moving bar 1004, the first and second spring 1000S1, 1000S2, may also be replaced or modified if the driving bar 1010 can be moved to each of the left and right positions according to the operation of the two actuators.

2-2. Structure of Clutch Assembly

The clutch assembly described below can be employed in any structure that can transmit or clamp power, interlocking with the accelerator pedal E and the brake pedal B.

Figure 10:
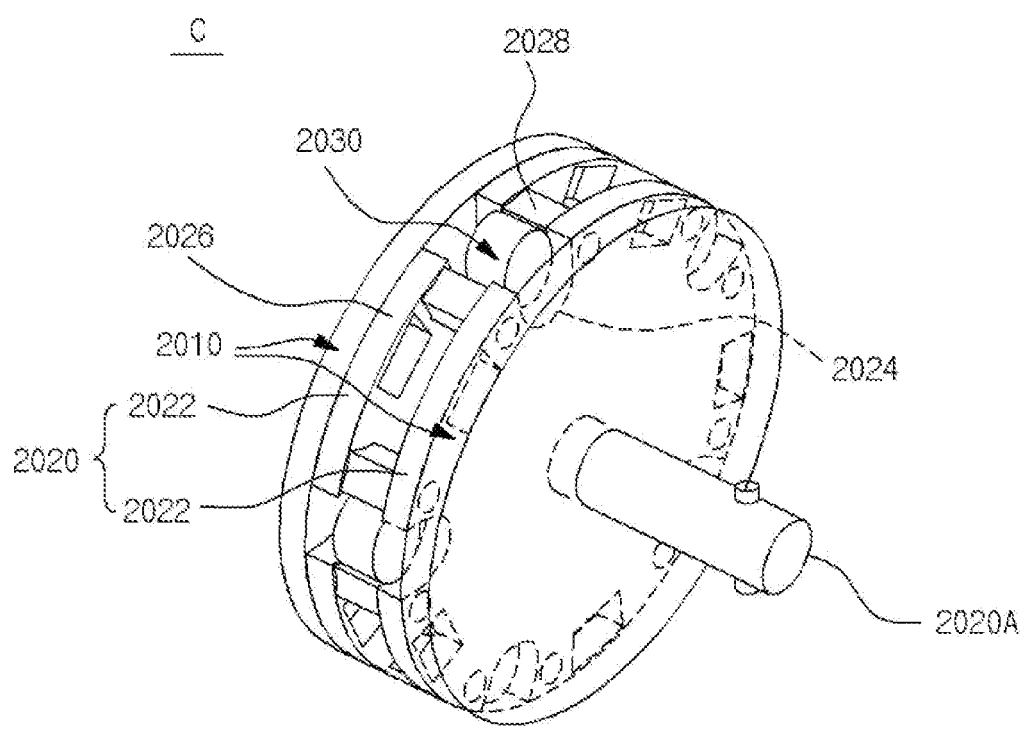
FIG. 10 is a perspective view of rims and a forked part included in a clutch assembly of the present invention. The rims form a frame of the clutch assembly, and the forked part is disposed between the rims.

FIG. 10 is a perspective view of rims 2010 and a forked part 2020 included in the clutch assembly C. The rims 2010 form a frame of the clutch assembly C, and the forked part 2020 is disposed between the rims 2010.

The rims 2010 consist of a pair of circular disks facing each other. The disks are joined together by tightening tools (not shown), and function as an integrated one body. The rims 2010 act as a housing.

Figure 11:
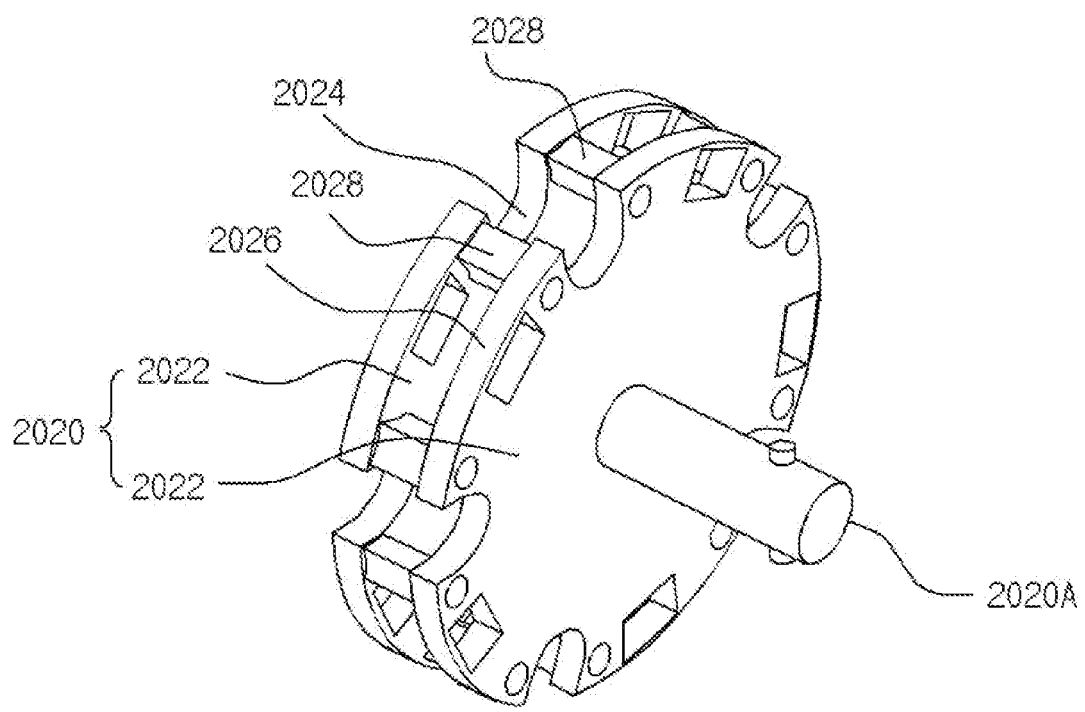
FIG. 11 is a drawing magnifying a portion of FIG. 10.

As illustrated in FIG. 11, the forked part 2020 includes forked plates 2022, a pair of approximately circular discs facing each other. On the outer circumference of the forked plate 2022, concave curved parts 2024, having five concaves for example, are formed at regular intervals, and the connection parts 2026 connect between the concave curved parts 2024. Forks 2028 are installed on both sides of the connection part 2026. Between the forks 2028 facing each other between two connection parts 2026, a rotary member 2030, such as a needle bearing, is installed.

The rotary member 2030 meets with the forks 2028 in both sides. In other words, the forks 2028 have a function of supporting the rotary member 2030. The rotary member 2030 is an independent element from the forked part 2020. The rotary member 2030 is mounted on the concave curved part 2024, and clipped by the forks 2028; accordingly, when the rotary member 2030 rotates, the forked parts 2020 also rotate. A rotary shaft 2020A is formed in the center of the forked part 2020, and the rotation of the rotary shaft 2020A is transmitted to the transmission Tr.

This invention is characterized by installations of an in-cam 2100 adjacent to the bottom of the rotary member 2030 and an out-cam 2200 adjacent to the top of the rotary member 2030, in the empty space between a pair of forked plates 2022.

Figure 12:
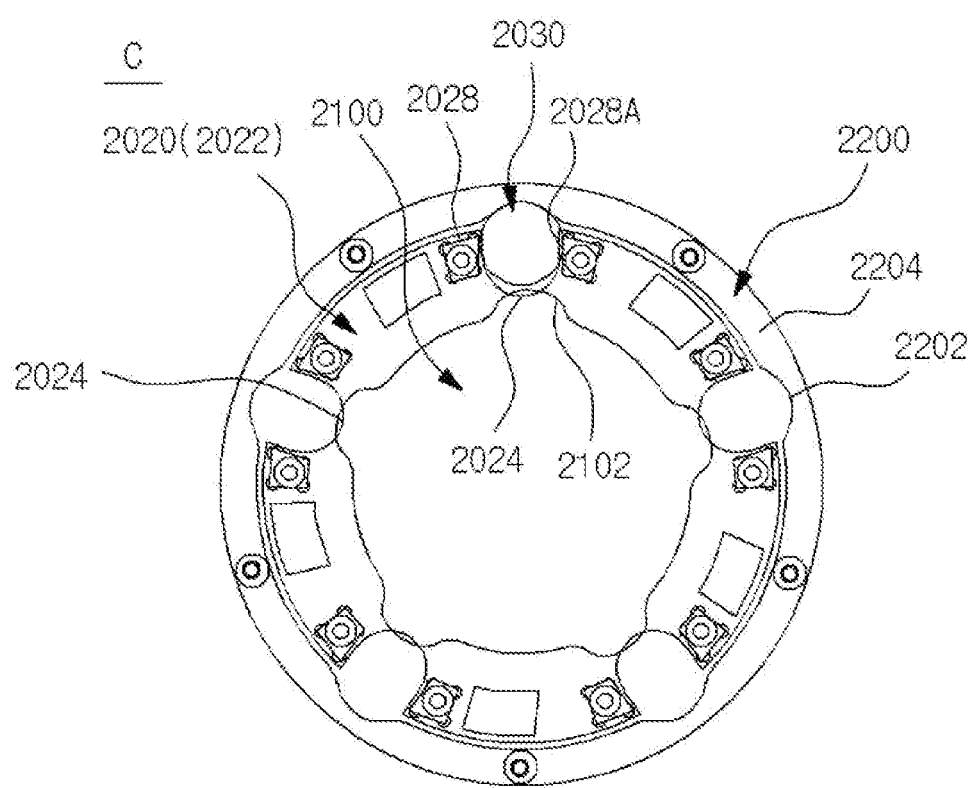
FIG. 12 is a cross-sectional view of the clutch assembly, cut in a space between forked plates of the forked part.

FIG. 12 is a cross-sectional view of the clutch assembly C, cut in a space between the forked plates 2022.

The in-cam 2100 has a pentagonal circular shape with a smaller diameter than that of the forked plate 2022. The out-cam 2200 is a circular disk shape with a larger diameter than that of the forked plate 2022. The in-cam 2100 and out-cam 2200 are only connected by the rotary member 2030, and are dynamically disconnected from each other. Therefore, even if any one of the in-cam 2100 and out-cam 2200 rotates, the other does not automatically rotate. Because the in-cam 2100 and out-cam 2200 are placed in the empty space between the forked plates 2022, there is no collision or interference between the in-cam 2100 and the forked plates 2022, or between the out-cam 2200 and the forked plates 2022 when the in-cam 2100 or out-cam 2200 rotates. The in-cam 2100 and out-cam 2200 does not consist of double plates, such as the rim 2010 or the forked part 2020. Each of the in-cam 2100 and out-cam 2200 is a single plate with a certain thickness.

The in-cam 2100 is connected to the rotary shaft of the engine Eg, which is not illustrated. Therefore, the in-cam 2100 is a dependent member that rotates automatically according to the engine Eg. The in-cam 2100 has curved convex surfaces 2102, having five convex parts for example, on the outer circumference of the in-cam 2100. The curved convex parts 2102 protrude outward at equal intervals according to the number of the rotary members 2030.

On the outer circumference of the out-cam 2200, rims 2204 are formed. On the inner side of the rim 2204, five curved receptive surfaces 2202 that are concave toward the outer surface of the rim 2204 at equal intervals according to the number of rotary members 2030. Each rotary member 2030 is aligned to each convex surface 2102 and receptive surface 2202. In FIG. 12, although a single rotary member 2030 is shown, five rotary members 2030 are mounted on the clutch assembly C.

The out-cam 2200 rotates clockwise or counterclockwise depending on pressing or releasing of the accelerator or brake pedal E,B. The driving shaft 2100' is connected to the shaft of the out-cam 2200, which is not illustrated, and the linear motion of the driving shaft 2100' is converted into the rotational motion of the out-cam 2200 through the shaft of the out-cam 2200. Accordingly, the position of the rotary member 2030 received in the receptive surfaces 2202 is moved.

In FIG. 12, the rotary member 2030 comes in contact with the apex of the receptive surfaces 2202, and is fully received. Accordingly, the rotary member 2030 is spaced apart from the convex surface 2102 with a fine distance. Therefore, even if the engine Eg and the in-cam 2100 rotate, the rotary member 2030 and the forked part 2020 supporting the rotary member 2030 do not rotate, and rotational force is not transmitted to the transmission Tr. In this respect, FIG. 12 illustrates the state of complete power disconnection by pressing the brake pedal B on the vehicle.

Figure 13:
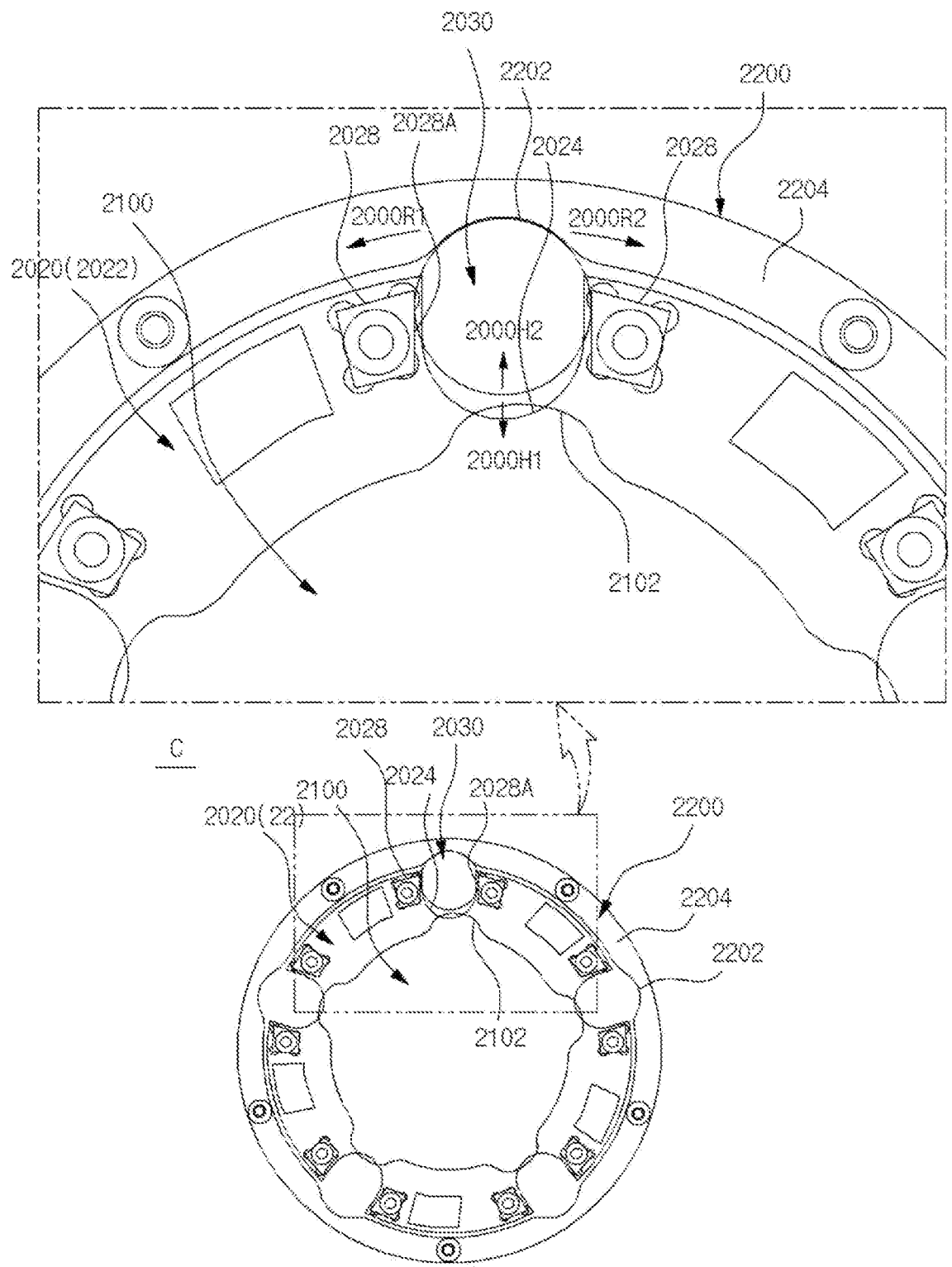
FIG. 13 is a drawing magnifying a portion of FIG. 12.

FIG. 13 is a drawing magnifying a portion of FIG. 12.

In the state of FIG. 13, when the out-cam 2200 rotates counterclockwise 2000R1, the receptive surfaces 2202 rotate in the same direction. In this instance, the other points other than the apex of the receptive surfaces 2202 forcibly push the rotary member 2030 downward; accordingly, the rotary member 2030 moves in a downward direction 2000H1. Because the rotary member 2030 is supported by the side 2028A of the forks 2028 as described above, and the forked part 2020 does not rotate even if the out-cam 2200 rotates, the rotary member 2030 does not move in lateral directions. Thus, the motion of the rotary member 2030 in the downward direction 2000H1 follows a linear path close to the vertical line along the side 2028A of the forks 2028. When the rotary member 2030 moves downward, the rotary member 2030 comes in contact with the convex surface 2102 of the in-cam 2100. Accordingly, when the engine Eg is driven and the in-cam 2100 rotates, the rotary member 2030 rotates according to the rotation of the convex surface 2102. Therefore, the forked part 2020 clipping the rotary member 2030 also rotates, and the rotational force is transmitted to the transmission Tr through the rotary shaft 2020A of the forked part 2020. The out-cam 2200 rotates according to the rotation of the rotary member 2030 because the rim 2204 of the out-cam 220 is always in contact with the rotary member 2030.

Likewise, if the out-cam 2200 rotates clockwise 2000R2 from the state shown in FIG. 13, the principle explained above can be applicable.

Referring to the explanation described above, and FIGS. 14 to 17, the operations of the clutch assembly C of the present invention will be described. The operations can categorize into when the accelerator pedal E is pressed, when the accelerator pedal E is released, when the brake pedal B is pressed, and when the brake pedal B is released.

Figure 14:
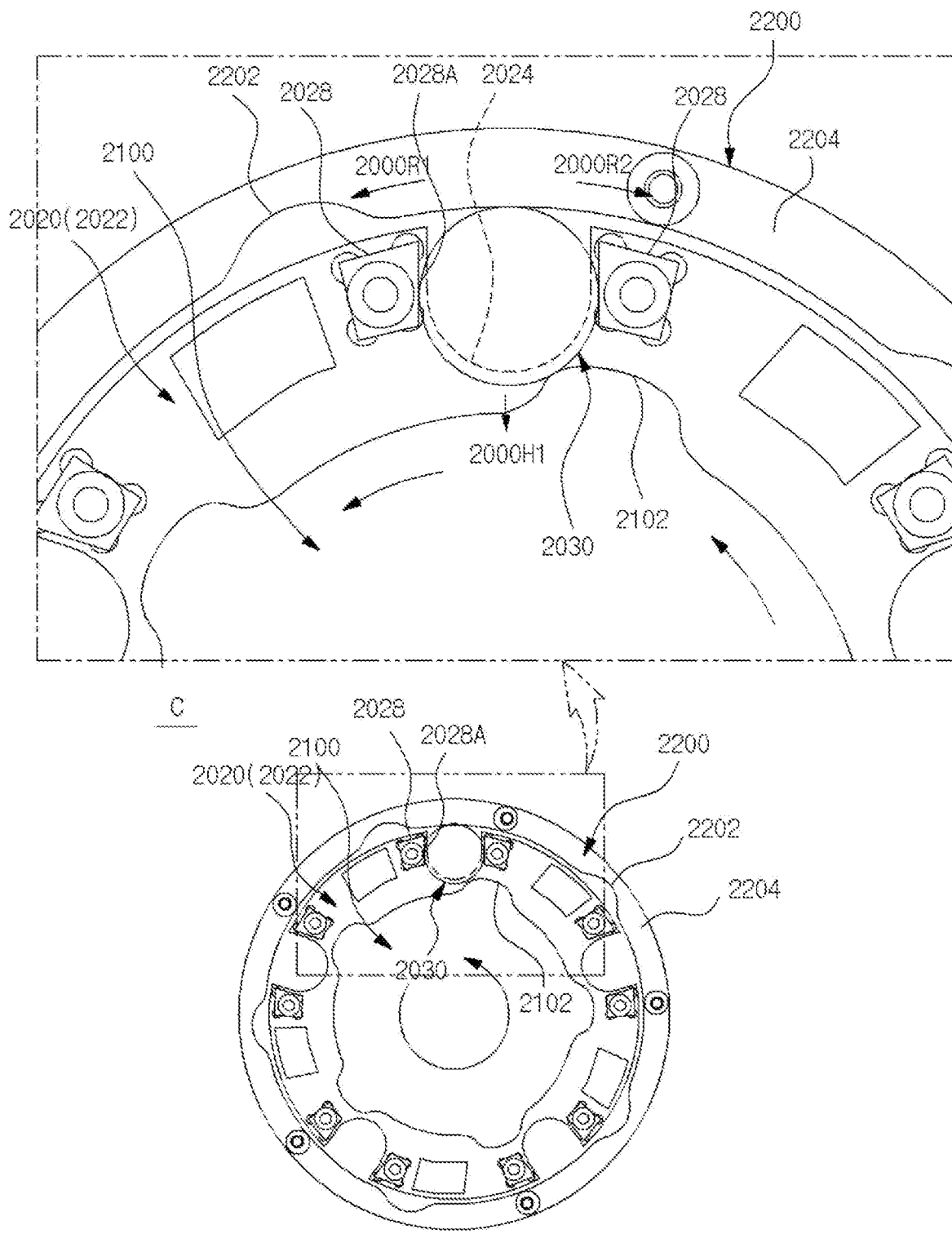
FIG. 14 is a drawing when the driver presses the accelerator pedal from the state shown in FIG. 12.

FIG. 14 is a drawing when the driver presses the accelerator pedal E from the state shown in FIG. 12. Assuming that the out-cam 2200 rotates counterclockwise 2000R1 according to accelerator pedal E, the result will be consistent as described in FIG. 13. Thus, as illustrated in FIG. 14, when the receptive surface 2202 pushes the rotary member 2030 down, the rotary member 2030 are escaped from the receptive surface 2202. Then, the flat surface of the inner rim 2204 presses the rotary member 2030. The rotary member 2030 moves downward by the depth of the receiving surface 2202, and comes in contact with the convex surface 2102 of the in-cam 2100. The rotational force of the in-cam 2100, which is rotated by acceleration of the engine Eg, is transmitted to the forked part 2020 through the rotary member 2030, and the rotation of the forked part 2020 is transmitted to the transmission Tr. In this instance, the out-cam 2200 that is in contact with the rotary member 2030 also rotates at the same time. When the accelerator pedal E is further pressed to the maximum, the out-cam 2200 rotates counterclockwise 2000R1 further. In this case, because the rotary member 2030 and the in-cam 2100 keep in constant contact with each other as shown in FIG. 14, there is no problem with power transmission.

Figure 15:
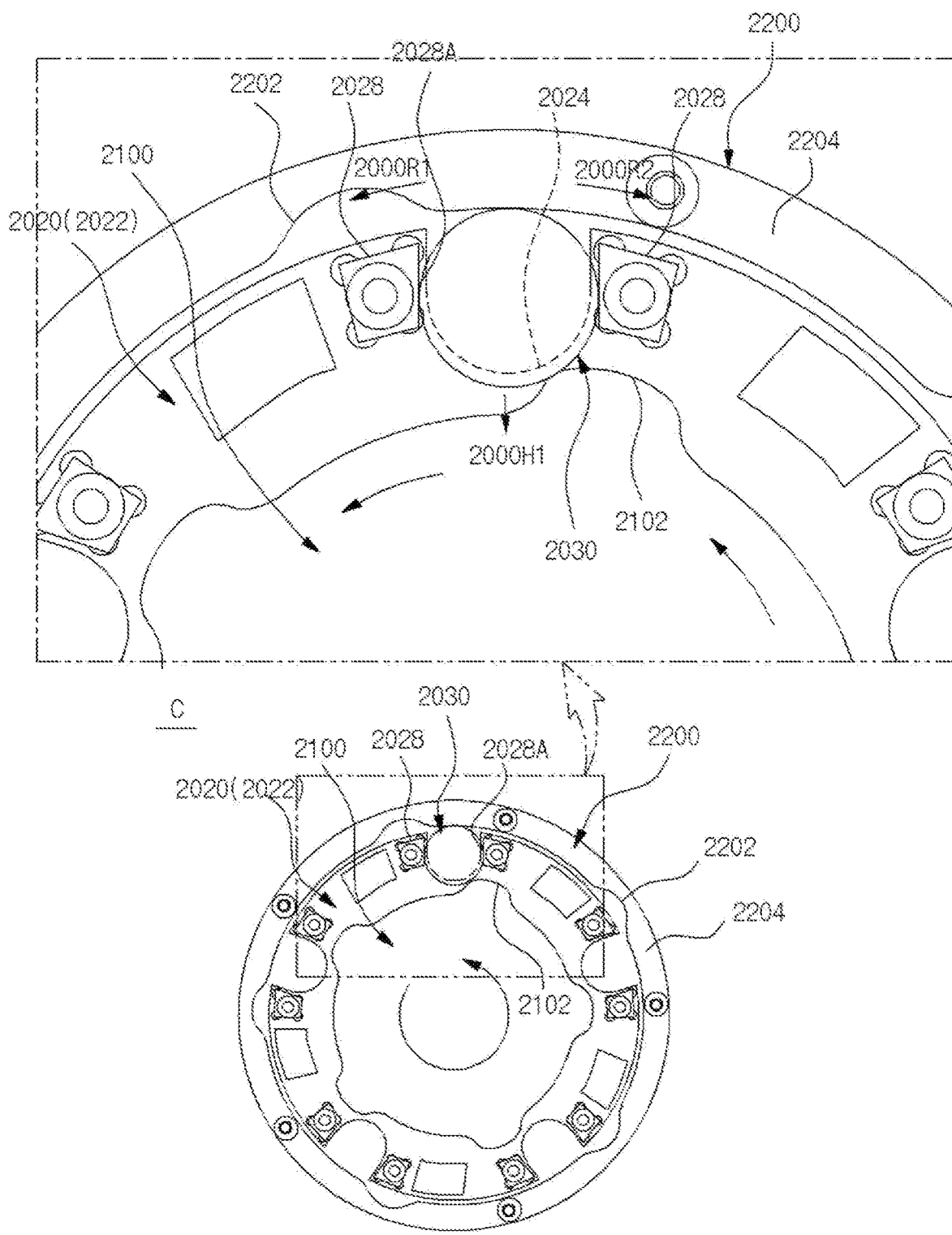
FIG. 15 is a drawing when the driver releases the accelerator pedal from the state shown in FIG. 14.

FIG. 15 is a drawing when the driver releases the accelerator pedal E from the state shown in FIG. 14. The out-cam 2200 is positioned where it slightly rotates clockwise 2000R2. Because the out-cam 2030 is still positioned on the flat inner surface of the inner rim 2204, the out-cam 2030 still transmits the torque of the engine Eg as the accelerator pedal E is pressed. In addition, the rotary member 2030 remains in contact with the convex surface 2102 of the in-cam 2100. Thus, compared to FIG. 14, the rotational force of the engine Eg is continuously transmitted to the forked part 2020 through the rotary member 2030, even though the acceleration of the engine Eg and the rotational force of the in-cam 2100 are reduced due to releasing of the accelerator pedal E. The out-cam 2200 in contact with the rotary member 2030 also keep rotating at the same time.

Figure 16:
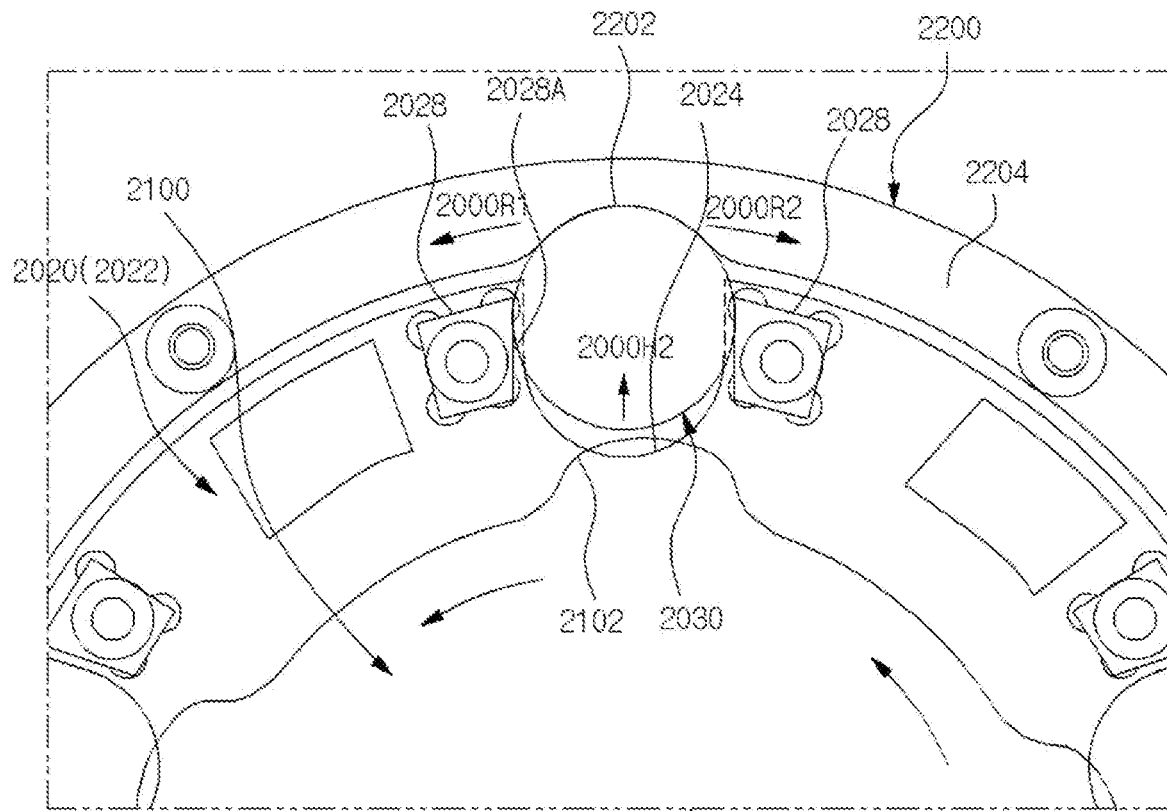
FIG. 16 is a drawing when the driver fully presses the brake pedal from the state shown in FIG. 15.
Figure 16:
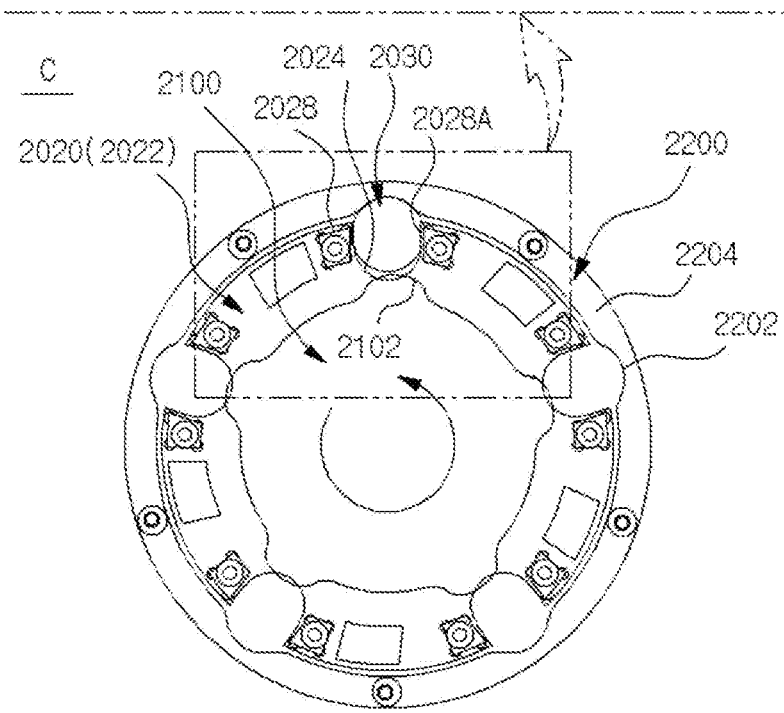

FIG. 16 is a drawing when the driver fully presses the brake pedal from the state shown in FIG. 15. The out-cam 2200 further rotates clockwise 2000R2 so that the rotary member 2030 moves up to comes in contact with the apex of the receptive surface 2202 as shown in FIG. 12, and is spaced apart from the convex surface 2102 of the in-cam 2100 with a fine distance. Therefore, power from the engine Eg is not transmitted to the transmission Tr.

It can be understood that when the brake pedal B is slowly pressed from the state of FIG. 15, the clutch assembly C changes its state towards FIG. 16. In other words, the rotary member 2030 is initially in contact with the in-cam 210, but by its centrifugal force, the rotary member 2030 begins to enter the receptive surface 2202 of the out-cam 2200 again, moving up vertically in the upward direction 2000H2. Accordingly, the contact area between the rotary member 2030 and the in-cam 2100 gets narrower. As soon as the rotary member 2030 reaches the apex of the receptive surface 2202, the rotary member 2030 is completely received in the receptive surface 2202, and spaced apart from the in-cam as shown in FIG. 16.

Figure 17:
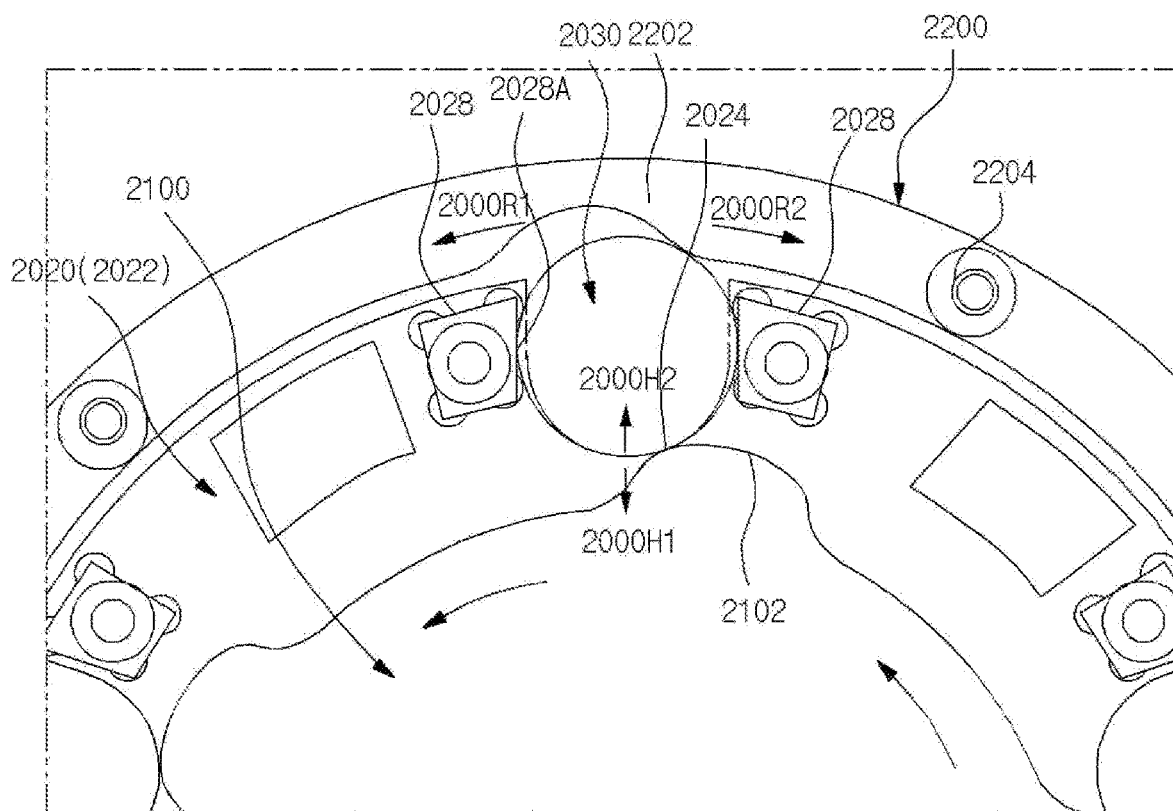
FIG. 17 is a drawing when the driver releases the brake pedal from the state shown in FIG. 16.
Figure 17:
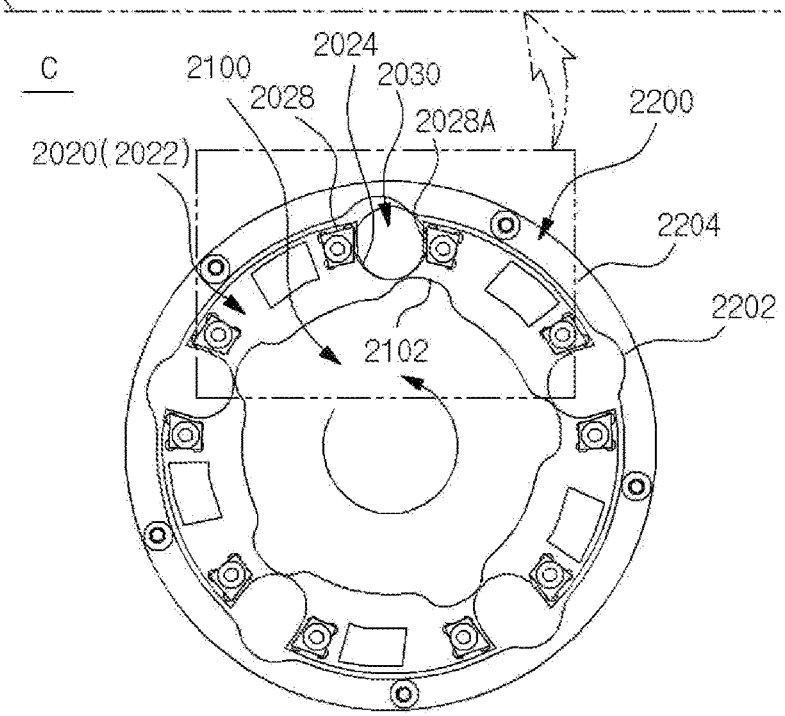

FIG. 17 is a drawing when the driver releases the brake pedal B from the state shown in FIG. 16. From the state shown in FIG. 16, the out-cam 2200 rotates slightly counterclockwise 2000R1, but the rotation distance is smaller than that of FIG. 14 because the accelerator pedal E is not pressed. In this instance, the out-cam 2200 rotates until the rotary member 2030 is located near the boundary between the receptive surface 2202 and the flat surface of the inner rim 2204. Then, the rotary member 2030 gradually moves in the downward direction 2000H1 and reaches to the position where the rotary member 2030 comes to contact with the convex surface 2102 of the in-cam 2100 as illustrated in FIG. 17. This is the aforementioned semi-clutch state, "the fourth state", which is the initial, unstable state of transmission of the rotational force of the engine Eg to the transmission Tr. As such, without a clutch pedal, the present invention can implement "a transitional state" or "intermediate state" used in manual transmission vehicles. This is a feature of the clutch assembly C of the present invention.

Referring to FIGS. 14 to 17 again, when the driver starts pressing the brake pedal B to drive the vehicle, releases the brake pedal B, and then presses the accelerator pedal E, the clutch assembly C of the present invention sequentially becomes in states shown in FIGS. 16, 17, and 14. While driving, the clutch assembly C is located at any states described in FIGS. 14 and 15, depending on the degree to which the driver presses the accelerator pedal E or brake pedal B. In this case, it is important that the engine Eg and the transmission Tr are always in the state of power connection. The change of driving speed of the vehicle is determined by the change in rotation of the engine Eg, and is independent of the clutch assembly C itself.

The clutch assembly C described above can be modified as various forms. The forked part 2020 may omit the fork 2028 as long as the forked part 2020 can clip and support the rotary member 2030. The number and shape of rotary member 2030 can be various, and other components other than a needle bearing can be used as long as they can be moved in the height direction between the in-cam 2100 and the out-cam 2200. In addition, a fastening member may be used to secure the fork 2028 to the rim so as to firmly support the rotary member 2030.

2-3. Rotary Shaft Assembly

Next, a rotary shaft assembly according to an embodiment of the present invention is described. The rotary shaft assembly is a device that converts linear motion of the driving shaft 3100' to rotational motion of the out-cam 2200 of the clutch assembly C. The following is one example of the present invention, and any structure that can convert linear motion of one member to rotational motion of other members, may be employed.

Figure 18:
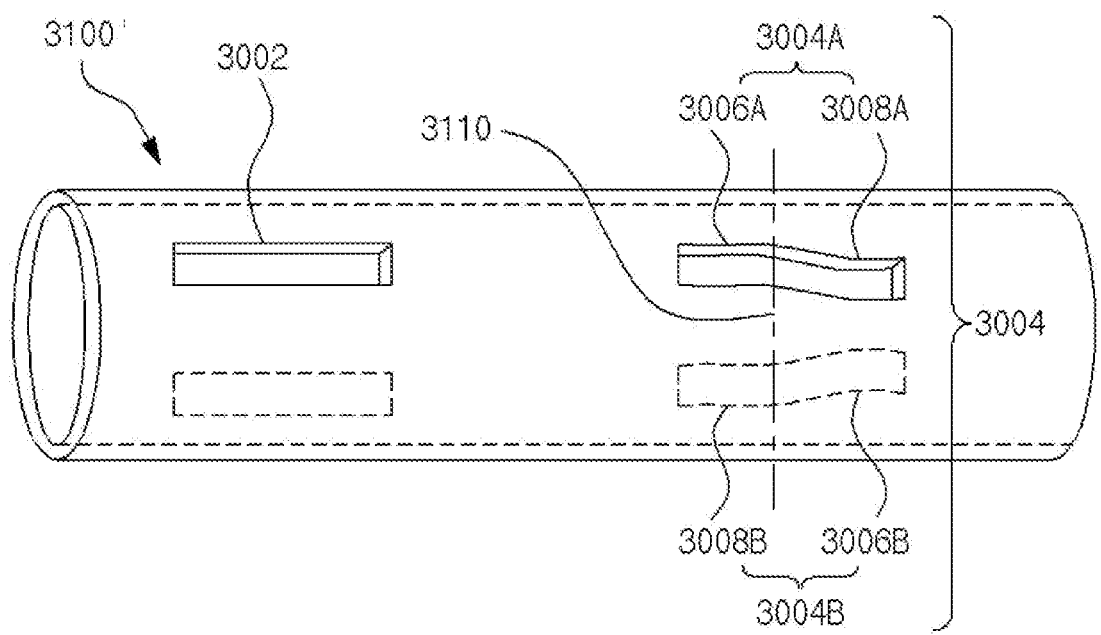
FIG. 18 is a perspective view of a driving shaft of a rotary shaft assembly of the present invention.

Referring to FIG. 18, a first guide slot 3002 and a second guide slot 3004 are formed on the sleeve of the driving shaft 3100' in the area adjacent to the clutch assembly C. Although not shown, the clutch assembly C is located on the left side of the FIG. 18, and the power transmission device 1000 is located on the right side of FIG. 18.

The first guide slots 3002 are a pair of long, straight channel shapes with specified lengths, formed along the longitudinal direction of the driving shaft 3100'. The pair of first guide slots 3002 may face each other with 180 degrees therebetween, but are limited to.

The second guide slots 3004 also have a second upper guide slot 3004A and a second lower guide slot 3004B facing each other. The second upper guide slot 3004A comprises a first path 3006A, which is a linear channel with a specified length, and a second path 3008A, which is an inclined channel connected to the first path 3006A. The second lower guide slot 3004B is a shape that the second upper guide slot 3004A rotates 180 degrees. In other words, a third path 3008B is formed along the outer surface of the driving shaft 3100' corresponding to the first path 3006A, and a fourth path 3006B, which is an inclined channel with a specified length, is formed corresponding to the second path 3008A. The boundaries between the first path 3006A and the second path 3008A and between the third path 3008B and fourth path 3006B are the same along the circumferential direction of the driving shaft 3100', as shown by the imaginary line. The lengths of the first path 3006A and the third path 3008B are the same, and the lengths of the second path 3008A and fourth path 3006B are the same. The second upper guide slot 3004A and the second lower guide slot 3004B may face each other with 180 degrees therebetween, but are not limited to.

Figure 19:
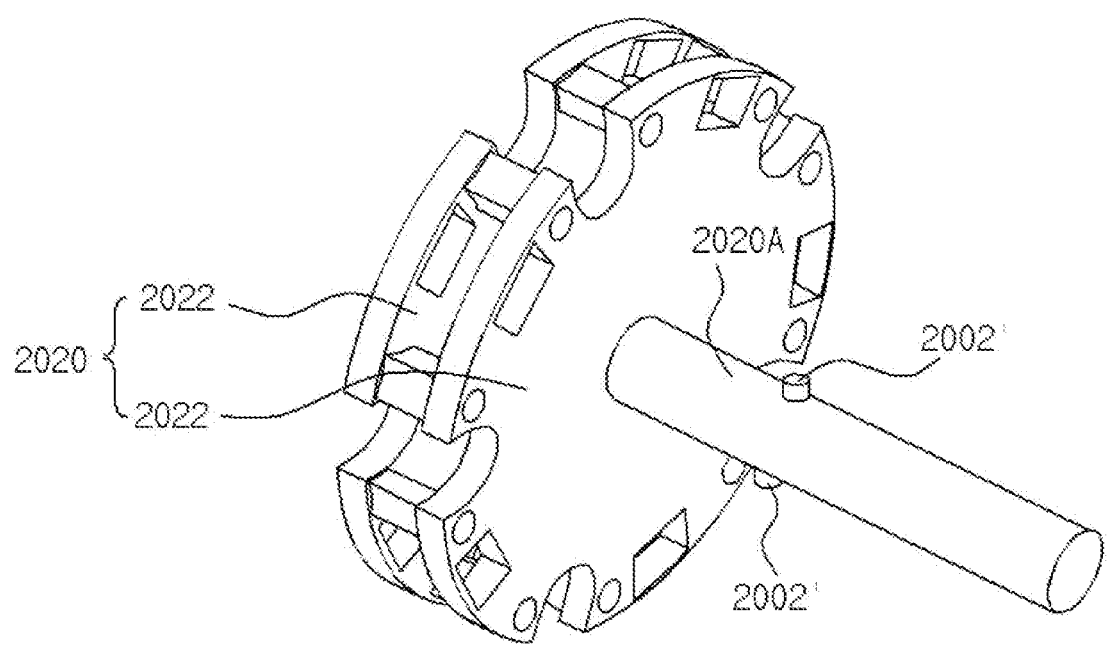
FIG. 19 is a perspective view of the forked part including a rotary shaft of the present invention.

Referring to FIG. 19, a pair of projections 2002' are formed on the rotary shaft 2020A of the forked part 2020. The projections 2002' are protruded from the sleeve of the rotary shaft 2020A outward in a radial directions perpendicular to the longitudinal direction of the rotary shaft 2020A. The pair of projections 2002 are employed to be inserted into each first guide slot 3002. The separation distance between the protrusions 2002' in the circumferential direction is the same as the separation distance of the first guide slot 3002, and the positions of the protrusions 2002' along the sleeve in the longitudinal direction are the same.

Figure 20:
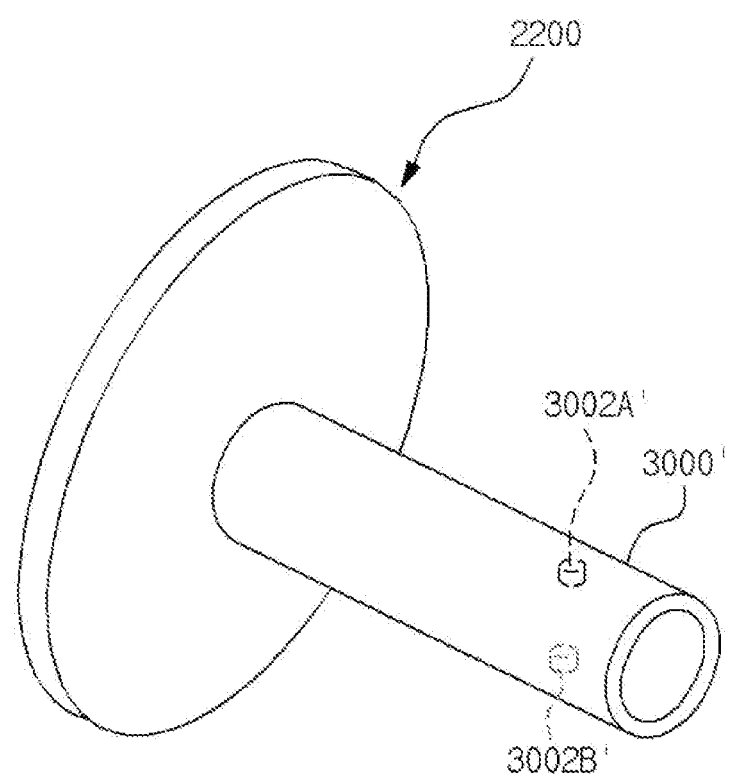
FIG. 20 is a perspective view of a clutch assembly including a rotary shaft of an out-cam of the present invention.

Referring to FIG. 20, a first and second protrusions 3002A', 3002B' are formed on the rotary shaft 3000' of the out-cam 2200. The first and second protrusions 3002A', 3002B' are protruded from the sleeve of the rotary shaft 3000' inward in a centripetal direction, which is perpendicular to the longitudinal direction of the rotary shaft 3000'. The first protrusion 3002A' is inserted into the second upper guide slot 3004A, and the second protrusion 3002B' into the second lower guide slot 3004B. The separation distance between the first and second protrusions 3002A', 3002B' in the circumferential direction is the same as the separation distance between the second upper and second lower guide slots 3004A, 3004B, and the positions of the first and second protrusions 3002A', 3002B' along the sleeve in the longitudinal direction are the same.

Figure 21:
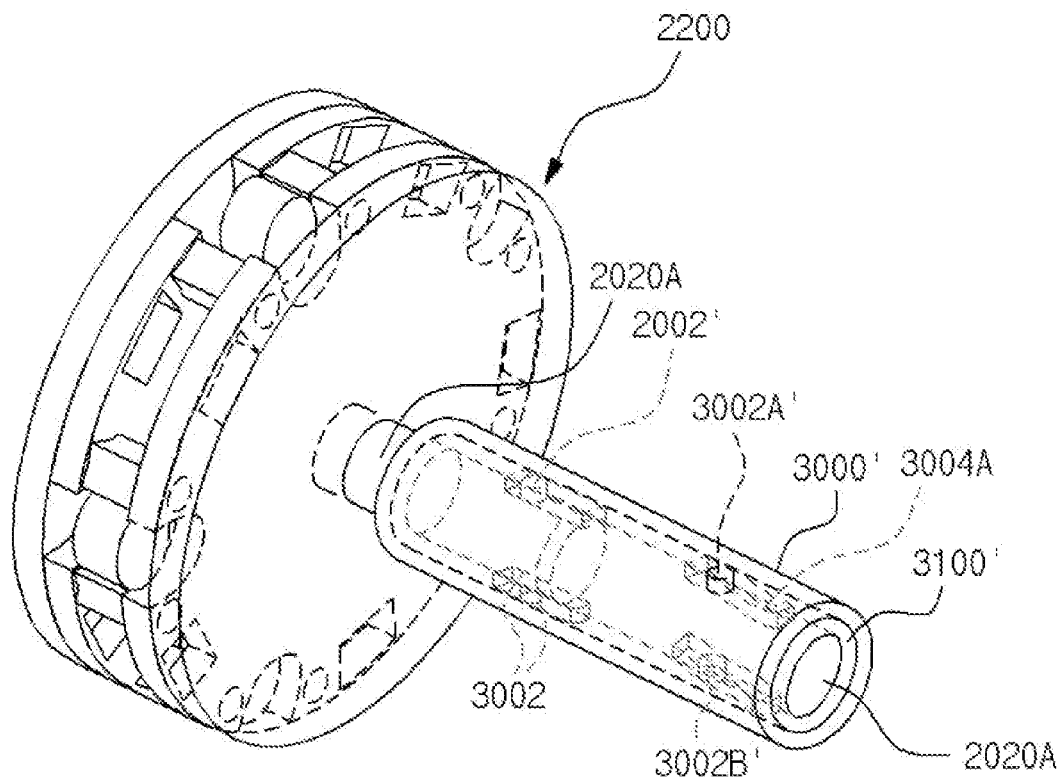
FIG. 21 is a perspective view of a combination of the rotary shaft assembly and the clutch assembly of the present invention.

FIG. 21 is a perspective view shown the structural connections between the driving shaft 3100' and the rotary shaft 2020A of the forked part 2020, and between the driving shaft 3100' and the rotary shaft 3000' of the out-cam 2200. The diameter of the driving shaft 3100' is greater than that of the rotary shaft 2020A, and smaller than that of the rotary shaft 3000'. Thus, if the three shafts are combined in the state in which the first guide slot 3002 of the driving shaft 3100' faces each protrusion 2002' below the driving shaft 3100', and the first and second protrusions 3002A', 3002B' above the driving shaft 3100', then the protrusions 2002' are inserted to the first guide slot 3002 of the driving shaft 3100' from the bottom to the top, and at the same time, the first and the second protrusion 3002A', 3002B' are inserted to the second upper and second lower guide slots 3004A, 3004B from the top to the bottom.

The diameter of the rotary shaft of the in-cam 2100, which is not illustrated, may be smaller than that of the rotary shaft 2020A of the forked part 2020, and joined to the rotary shaft 2020A, or the rotary shaft 2020A itself may be a part of the rotary shaft of the in-cam 2100. Therefore, the rotation of the engine Eg is transmitted to the transmission Tr through the driving shaft 3100' without interference or collision with the rotary shaft assembly of the present invention.

Figure 22:
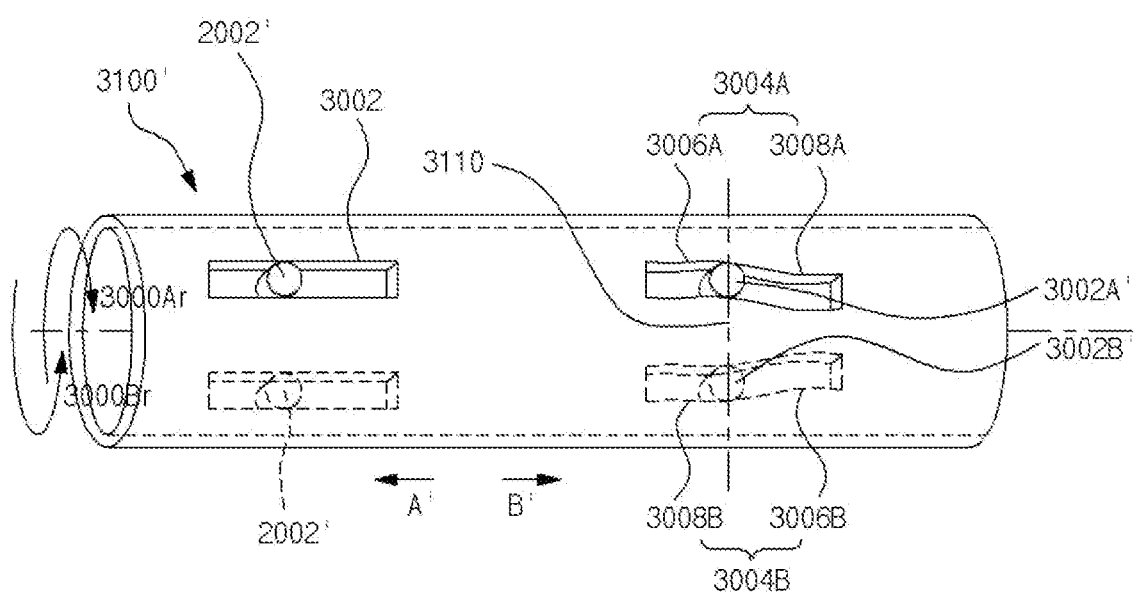
FIG. 22 is a drawing for explaining functions of the rotary shaft assembly of the present invention.

Referring to FIG. 22 based on the explanation above, the rotation of the out-cam 2200 according to linear motion of the driving shaft 3100' will be described.

When the driver presses the accelerator pedal P, and the driving shaft 3100' is linearly moved to the left side, that is, to an A' direction, the first guide slot 3002 moves in the same direction, but the protrusions 2002' does not move in the circumferential direction because the first guide slot 3002 is a line shape. Therefore, the forked part 2020 does not rotate and remains in a stable position.

Meanwhile, when the second upper guide slot 3004A moves linearly, the slope of the second path 3008A pressurizes the first protrusion 3002A'. Accordingly, the first protrusion 3002A' cannot stay in the original place, and the first protrusion 3002A' is pressurized to rotate in a first direction 3000Ar, by the angle formed between the first path 3006A and the second path 3008A. Likewise, when the second lower guide slot 3004B moves linearly, the slope of the fourth path 3006B pressurizes the second protrusion 3002B'. Accordingly, the second protrusion 3002B' cannot stay in the original place, and the second protrusion 3002B' is pressurized to rotate in the first direction 3000Ar, by the angle formed between the third path 3008B and the fourth path 3006B. Therefore, the rotary shaft 3000' of the out-cam 2200 is supported by the first and second protrusion 3002A', 3002B' and rotates in the first direction 3000Ar, and eventually the out-cam 2200 rotates.

In the state that the driving shaft moves in the A' direction, when the brake pedal is pressed in reverse, and the driving shaft 3100' moves linearly to the right side, in the B' direction for example, the first guide slot 3002 moves in the same direction, but the protrusions 2002 does not move in the circumferential direction because the first guide slot 3002 is a line shape. Therefore, the forked part 2020 does not rotate and remains in the stable position.

Meanwhile, when the second upper guide slot 3004A moves linearly, the slope of the second path 3008A pressurizes the first protrusion 3002A'. Accordingly, the first protrusion 3002A' cannot remain in the original place and is pressurized to rotate in a second direction 3000Br, by the angle formed between of the first path 3006A and the second path 3008A. Likewise, when the second lower guide slot 3004B moves linearly, the slope of the fourth path 3006B pressurizes the second protrusion 3002B'. Accordingly, the second protrusion 3002B' cannot stay in the original place, and the second protrusion 3002B' is pressurized to rotate in the first direction 3000Ar, by the angle formed between the third path 3008B and the fourth path 3006B. Therefore, the rotary shaft 3000' of the out-cam 2200 is supported by the first and second protrusion 3002A', 3002B' and rotates in the second direction 3000Br, and eventually the out-cam 2200 rotates.

While embodiments of the present invention have been described, the present invention is not limited to what has been particularly shown.

The clutch system of the present invention can be widely applied to various vehicles using manual transmission shift, such as heavy duty trucks, buses, heavy machinery, military vehicles, or armored trucks as well as cars.

What is claimed is:

1. A clutch system comprising:
a clutch assembly connected or disconnected to an engine of a vehicle, wherein a state of the clutch assembly is changed by pressing or releasing of an accelerator pedal or a brake pedal, and
a rotary shaft assembly including:
a power transmission device transmitting a motion of pressing or releasing of the accelerator pedal and the brake pedal into the clutch assembly, and
a driving shaft connected to the power transmission device,
wherein the clutch assembly is in any one of states including:
a first state transmitting a rotational force of the engine by pressing the accelerator pedal;
a third state cutting off a connection between the engine and the driving shaft by pressing the brake pedal, and
a fourth state that is an initial transition state or intermediate state transmitting a rotational force of the engine to the transmission by releasing the brake pedal,
wherein the clutch assembly includes:
an out-cam rotating in conjunction with actuation of the accelerator pedal and the brake pedal of the vehicle;
an in-cam rotating according to rotation of the engine of the vehicle;
a rotary member contacted with the out-cam and selectively contacted with the in-cam by moving in a height direction according to rotation of the out-cam, and
a forked part supporting the rotary member and rotating in conjunction with the rotary member,
wherein a rotational force of the engine is sequentially transmitted through the in-cam, the rotary member, and the forked part.

2. The clutch system of claim 1, wherein the driving shaft of a rotational body assembly connected to the power transmission device linearly moves to a first direction by pressing the accelerator pedal, and the clutch assembly is positioned in the first state.

3. The clutch system of claim 2, wherein the driving shaft of the rotational body assembly connected to the power transmission device linearly moves to a second direction that is opposite to the first direction by pressing the brake pedal, and the clutch assembly is positioned in the third state.

4. The clutch system of claim 3, wherein the driving shaft of the rotational body assembly connected to the power transmission device linearly moves to the first direction by releasing the brake pedal from the third state, and the clutch assembly is positioned in the fourth state.

5. The clutch system of claim 1, wherein the power transmission device includes:
an accelerator actuator connected to a cable of the accelerator pedal to drive, and
a brake actuator connected to a cable of the brake pedal to drive and placed in an opposite side to the accelerator actuator.

6. The clutch system of claim 1, wherein at least one of protrusion is formed on a sleeve of a rotary shaft of the out-cam of the clutch assembly,
    wherein at least one of guide slot is formed on the driving shaft to receive the protrusion, respectively,
    wherein the guide slot includes:
        a first path having a linear shape, and
        a second path extending to form an inclined angle with the first path,
    wherein the protrusion rotates by the inclined angle formed between the first and the second path according to linear movement of the driving shaft in one direction, thereby rotating the out-cam.

\* \* \* \* \*